United States Patent
Miki (10) Patent No.: US 10,110,304 B2
(45) Date of Patent: Oct. 23, 2018

(54) COMMUNICATION DEVICE AND INSPECTION METHOD

(71) Applicant: FUJITSU LIMITED, Kawasaki-shi, Kanagawa (JP)

(72) Inventor: Atsushi Miki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/607,723

(22) Filed: May 30, 2017

(65) Prior Publication Data

US 2017/0373757 A1    Dec. 28, 2017

(30) Foreign Application Priority Data

Jun. 22, 2016  (JP) .................................. 2016-123857

(51) Int. Cl.
| | |
|---|---|
| *H04B 10/077* | (2013.01) |
| *H04B 10/40* | (2013.01) |
| *H04B 10/079* | (2013.01) |
| *H04B 10/07* | (2013.01) |
| *H04B 17/10* | (2015.01) |
| *H04B 10/50* | (2013.01) |
| *H04B 10/60* | (2013.01) |
| *H04B 10/25* | (2013.01) |

(52) U.S. Cl.
CPC ....... *H04B 10/2503* (2013.01); *H04B 10/077* (2013.01); *H04B 10/0779* (2013.01); *H04B 10/0799* (2013.01); *H04B 10/40* (2013.01); *H04B 17/10* (2015.01); *H04B 2210/07* (2013.01)

(58) Field of Classification Search
None
See application file for complete search history.

(56) References Cited

U.S. PATENT DOCUMENTS

2004/0264976 A1* 12/2004 Kim ................. H04B 10/07953
398/155
2014/0363158 A1* 12/2014 Chang ................ H04B 10/2575
398/43

FOREIGN PATENT DOCUMENTS

| JP | 59-111433 | 6/1984 |
| JP | 05-211483 | 8/1993 |
| JP | 05-268386 | 10/1993 |

* cited by examiner

Primary Examiner — Darren W Wolf
(74) Attorney, Agent, or Firm — Fujitsu Patent Center (57) ABSTRACT

A communication device includes: an optical-communication circuit that is capable of performing optical communication with a different communication device and transmits a first electric signal to the different communication device at a startup time of the communication device; an electro-communication circuit that is capable of performing electro communication with the different communication device and receives a second electric signal transmitted from the different communication device in response to the first electric signal; and a control circuit that transmits error information indicating an error in the optical communication to a device after the second electric signal is received by the electro-communication circuit.

6 Claims, 10 Drawing Sheets

FIG. 9 ns can provide a communication system with optical and electrical communication modules.

COMMUNICATION DEVICE AND INSPECTION METHOD

CROSS-REFERENCE TO RELATED APPLICATION

This application is based upon and claims the benefit of priority of the prior Japanese Patent Application No. 2016-123857, filed on Jun. 22, 2016, the entire contents of which are incorporated herein by reference.

FIELD

The embodiments discussed herein are related to a communication device and an inspection method.

BACKGROUND

For inter-module communication in computers, such as supercomputers, optical communication is used.

Japanese Laid-open Patent Publication Nos. 59-111433, 05-211483, and 05-268386 discuss the related art.

In the above-described related art, at the time of power supply to communication devices which are capable of communicating with each other, a difference in the startup timing may be generated between the communication devices. In this case, the communication device started earlier may fail to receive an optical signal from the other communication device (communicating device) which has not yet started. This may be mistaken for an optical communication error.

It is an object of the embodiments to provide a communication device and an inspection method which are possible to reduce false detection of optical communication errors even if the startup timing is different between communication devices.

SUMMARY

According to an aspect of the embodiments, a communication device includes: an optical-communication circuit that is capable of performing optical communication with a different communication device and transmits a first electric signal to the different communication device at a startup time of the communication device; an electro-communication circuit that is capable of performing electro communication with the different communication device and receives a second electric signal transmitted from the different communication device in response to the first electric signal; and a control circuit that transmits error information indicating an error in the optical communication to a device after the second electric signal is received by the electro-communication circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In a transmission system in which multiple optical communication devices are coupled with each other by an optical fiber cable, the operations of the optical communication devices are monitored under remote control via metal lines included in the optical fiber cable.

For example, the coupling state between an optical transmitter and an optical receiver via optical fibers is determined in accordance with the state in which the optical transmitter receives an optical signal from the optical receiver. By using an optical fiber cable coated with a conductive material, for example, when a signal is not correctly received due to power OFF of a subscriber terminal, emergency power is supplied to the subscriber terminal via the optical fiber cable.

Figure 1:
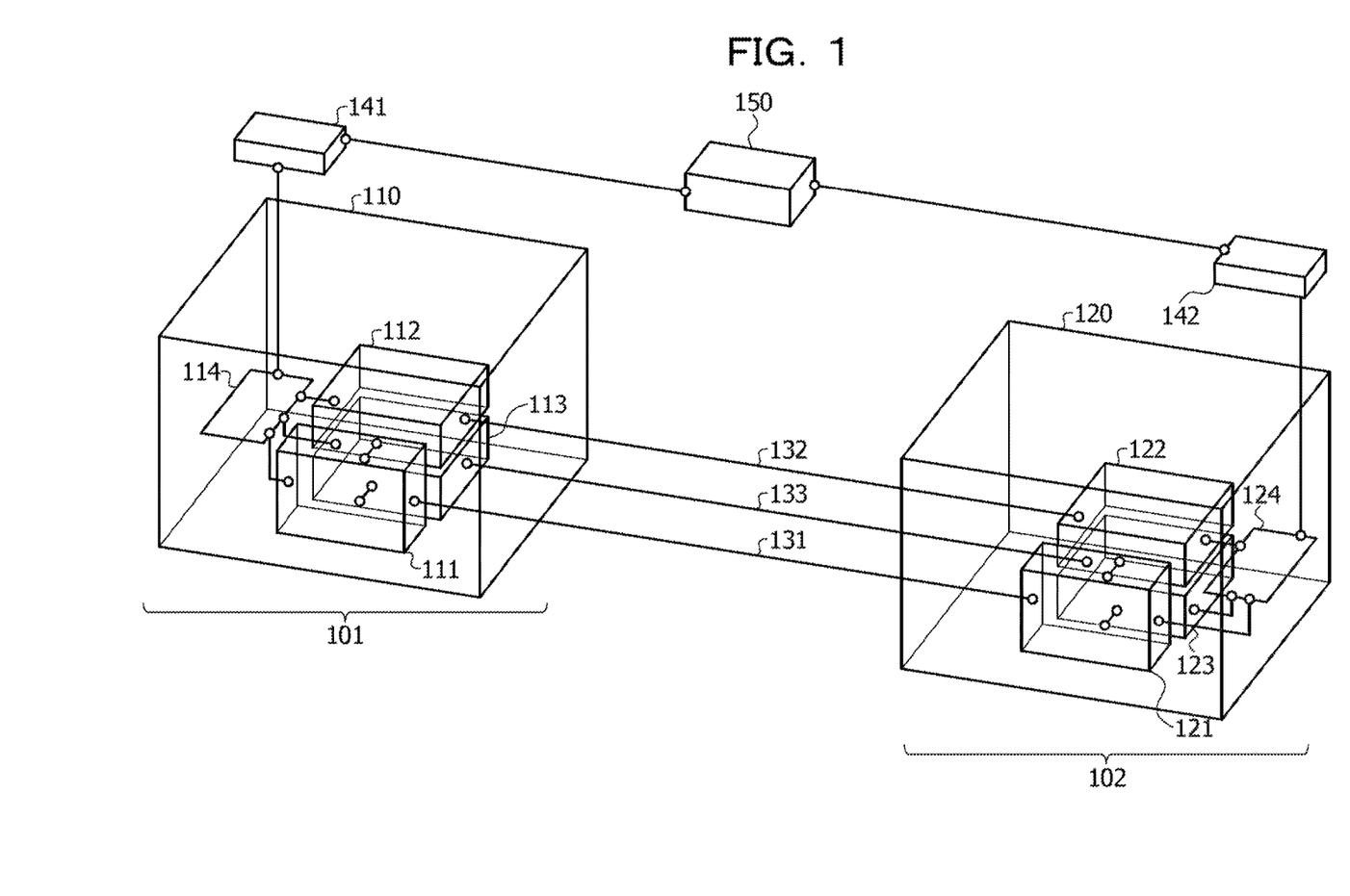
FIG. 1 illustrates an example of a communication system and an example of communication devices.

FIG. 1 illustrates an example of a communication system and an example of communication devices. The communication system illustrated in FIG. 1 includes first and second communication devices 101 and 102 and a log device 150.

The first communication device 101 is an optical-communication and electro-communication module including a first communication module 110 and a first control circuit 141. The first communication module 110 is capable of performing optical communication and electro communication. The first control circuit 141 controls optical communication and electro communication performed by the first communication module 110. Although in FIG. 1 the first control circuit 141 is disposed outside the first communication module 110, it may be disposed within the first communication module 110.

The second communication device 102 is an optical-communication and electro-communication module including a second communication module 120 and a second control circuit 142. The second communication module 120 is capable of performing optical communication and electro communication. The second control circuit 142 controls optical communication and electro communication performed by the second communication module 120. Although in FIG. 1 the second control circuit 142 is disposed outside the second communication module 120, it may be disposed within the second communication module 120.

The first and second communication modules 110 and 120 are coupled to each other via a power supply line 131. The first and second communication modules 110 and 120 are also coupled to each other via an optical signal line 132 and an electric signal line 133 so that they may be able to communicate with each other. The optical signal line 132 may be an optical transmission channel such as an optical fiber. The electric signal line 133 may be an electric transmission channel such as a metal line.

The optical signal line 132 includes a signal line for transmitting an optical signal from the first communication module 110 to the second communication module 120 and a signal line for transmitting an optical signal from the second communication module 120 to the first communication module 110. This allows full-duplex communication using optical signals between the first and second communication modules 110 and 120.

The electric signal line 133 includes a signal line for transmitting an electric signal from the first communication module 110 to the second communication module 120 and a signal line for transmitting an electric signal from the second communication module 120 to the first communication module 110. This allows full-duplex communication using electric signals between the first and second communication modules 110 and 120.

The first communication module 110 includes a power supply circuit 111, an optical-communication controller 112, an electro-communication controller 113, and a control register 114. The power supply circuit 111 supplies power to the optical-communication controller 112 and the electro-communication controller 113. The power supply circuit 111 may supply power to the second communication module 120 via the power supply line 131 under the control of the first control circuit 141 via the control register 114.

When the power supply circuit 111 has not yet started, power being supplied from the second communication module 120 via the power supply line 131 is supplied to the optical-communication controller 112 and the electro-communication controller 113 via the power supply circuit 111. As the technology for supplying external power to the optical-communication controller 112 and the electro-communication controller 113 via the power supply circuit 111 in this manner, Power over Ethernet (PoE) may be used. Ethernet is a registered trademark.

The optical-communication controller 112 may be an optical communication unit that performs optical communication with the second communication module 120 via the optical signal line 132. The optical-communication controller 112 performs optical communication by using power supplied from the power supply circuit 111 under the control of the first control circuit 141 via the control register 114. The electro-communication controller 113 may be an electro-communication unit that performs electro-communication with the second communication module 120 via the electric signal line 133. The electro-communication controller 113 performs electro communication by using power supplied from the power supply circuit 111 under the control of the first control circuit 141 via the control register 114.

The control register 114 may be a storage unit used for controlling the power supply circuit 111, the optical-communication controller 112, and the electro-communication controller 113 from the outside of the first communication module 110. The first control circuit 141 is able to monitor communications performed by the optical-communication controller 112 and the electro-communication controller 113 via the control register 114.

The first control circuit 141 may be a controller that controls the power supply circuit 111, the optical-communication controller 112, and the electro-communication controller 113 via the control register 114. As the first control circuit 141, a processor such as a field programmable gate array (FPGA) or a digital signal processor (DSP) may be used. If a loss of signal (LOS) alarm indicating optical communication interruption is output from the optical-communication controller 112 via the control register 114, the first control circuit 141 sends this LOS alarm to the log device 150.

The second communication module 120 includes a power supply circuit 121, an optical-communication controller 122, an electro-communication controller 123, and a control register 124. The power supply circuit 121 supplies power to the optical-communication controller 122 and the electro-communication controller 123. The power supply circuit 121 may supply power to the first communication module 110 via the power supply line 131 under the control of the second control circuit 142 via the control register 124.

When the power supply circuit 121 has not yet started, power being supplied from the first communication module 110 via the power supply line 131 is supplied to the optical-communication controller 122 and the electro-communication controller 123 via the power supply circuit 121. As the technology for supplying external power to the optical-communication controller 122 and the electro-communication controller 123 via the power supply circuit 121 in this manner, PoE may be used.

The optical-communication controller 122 may be an optical communication unit that performs optical communication with the first communication module 110 via the optical signal line 132. The optical-communication controller 122 performs optical communication by using power supplied from the power supply circuit 121 under the control of the second control circuit 142 via the control register 124. The electro-communication controller 123 may be an electro-communication unit that performs electro communication with the first communication module 110 via the electric signal line 133. The electro-communication controller 123 performs electro communication by using power supplied from the power supply circuit 121 under the control of the second control circuit 142 via the control register 124.

The control register 124 may be a storage unit used for controlling the power supply circuit 121, the optical-communication controller 122, and the electro-communication controller 123 from the outside of the second communication module 120. The second control circuit 142 is able to monitor communications performed by the optical-communication controller 122 and the electro-communication controller 123 via the control register 124.

The second control circuit 142 may be a controller that controls the power supply circuit 121, the optical-communication controller 122, and the electro-communication controller 123 via the control register 124. As the second control circuit 142, a processor such as a FPGA or a DSP may be used. If a LOS alarm indicating optical communication interruption is output from the optical-communication controller 122 via the control register 124, the second control circuit 142 sends this LOS alarm to the log device 150.

The log device 150 may be a host device that stores a log concerning communications between the first and second communication modules 110 and 120. This log includes LOS alarms sent from the first and second control circuits 141 and 142.

The log device 150 is accessible by the administrator of the communication system illustrated in FIG. 1, for example. The administrator may obtain a log from the log device 150 directly or via a network. The log device 150 may include a communication interface between the first and second communication modules 110 and 120, a non-volatile memory for storing a log, and a user interface or a communication interface accessible from the administrator.

In FIG. 1, the first and second communication modules 110 and 120 are controlled by the first and second control circuits 141 and 142, respectively. However, this configuration is only an example. The first and second communication modules 110 and 120 may alternatively be controlled by a single control circuit.

In FIG. 1, a LOS alarm output from the first communication module 110 and a LOS alarm output from the second communication module 120 are sent to the log device 150. However, this configuration is only an example. A LOS alarm output from the first communication module 110 and a LOS alarm output from the second communication module 120 may alternatively be sent to different log devices.

In FIG. 1, the log device 150 is disposed outside the first and second communication devices 101 and 102. However, this configuration is only an example. The log device 150 may alternatively be disposed within the first communication device 101 or the second communication device 102.

In FIG. 1, an external communication device may supply power to the first and second communication modules 110 and 120 together by remote control. In this case, a difference in the startup timing may be generated between the first and second communication modules 110 and 120 (see FIG. 2, for example).

Figure 2:
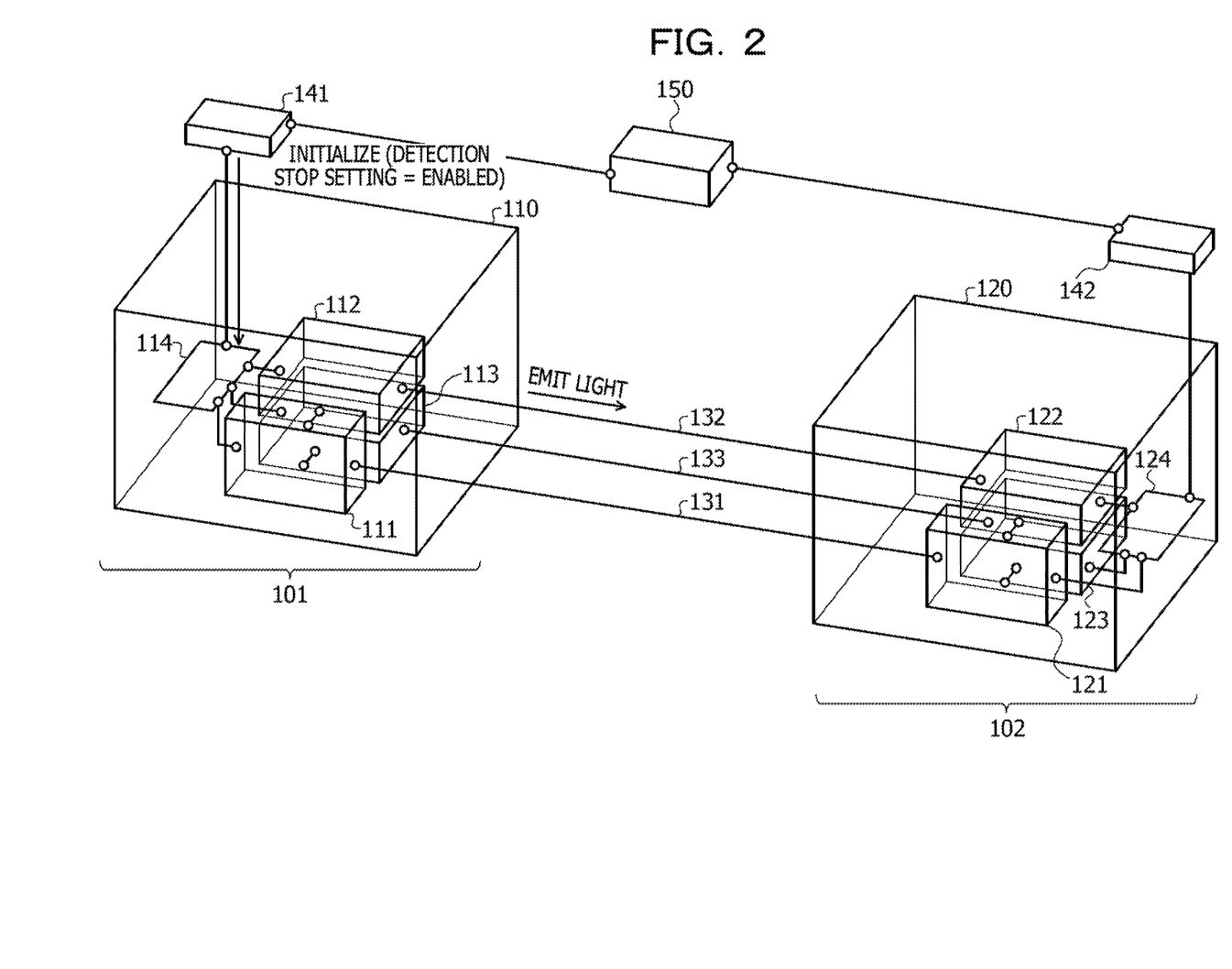
FIG. 2 illustrates an example of a state in which one of two commination devices has started earlier than the other.

This time difference occurs due to a difference between a timing at which power is supplied to the first communication module 110 and a timing at which power is supplied to the second communication module 120 or a difference between the time taken for executing processing for starting the first communication module 110 and that for starting the second communication module 120. When the first and second communication modules 110 and 120 are started, they are ready to perform optical communication and electro communication.

FIG. 2 illustrates an example of a state in which one of two commination devices has started earlier than the other. In FIG. 2, elements similar to those in FIG. 1 are designated by like reference numerals, and an explanation thereof may be omitted. In FIG. 2, for example, the first communication module 110 has started earlier than the second communication module 120.

In this state, as illustrated in FIG. 2, the first control circuit 141 initializes the control register 114. This enables the optical channel in the optical-communication controller 112, and the optical-communication controller 112 emits light. An optical signal emitted from the optical-communication controller 112 is ready to be sent to the second communication module 120 via the optical signal line 132.

The initialization of the control register 114 enables a detection stop setting for stopping the detection of LOS alarms (detection stop setting=enabled). The optical-communication controller 112 thus enters a state in which it does not output a LOS alarm indicating optical communication interruption even if it fails to receive an optical signal from the second communication module 120. This may reduce the possibility that a LOS alarm will be sent to the log device 150 because of the incomplete startup of the power supply circuit 121 of the second communication module 120.

In FIG. 2, the power supply circuit 121 of the second communication module 120 has not yet started, and thus, the first communication module 110 fails to receive an optical signal from the second communication module 120. At this stage, the first communication module 110 may not be able to determine whether the power supply circuit 121 of the second communication module 120 has not yet started or the power supply circuit 121 has already started but an optical communication error is occurring.

Figure 3:
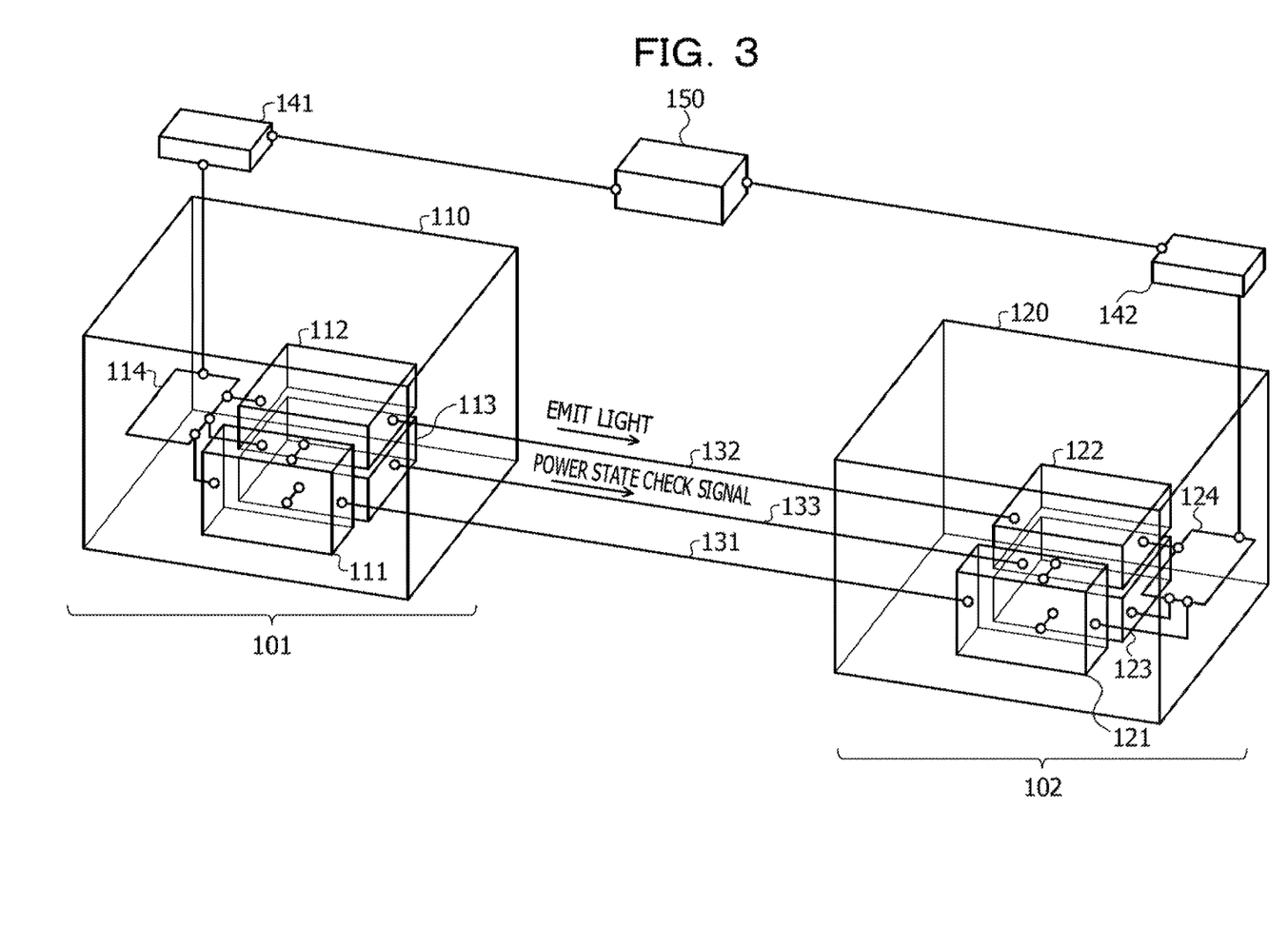
FIG. 3 illustrates an example of a state in which a communication device module is accessing the other communication device module with an electric signal.

FIG. 3 illustrates an example of a state in which a communication device module is accessing the other communication device module with an electric signal. In FIG. 3, elements similar to those in FIG. 2 are designated by like reference numerals, and an explanation thereof may be omitted. After the state illustrated in FIG. 2, the first control circuit 141 causes the electro-communication controller 113 to send a power state check signal to the second communication module 120 via the electric signal line 133.

The power state check signal is an electric signal for checking the power state of the second communication module 120. If the power supply circuit 121 of the second communication module 120 has already started, the second communication module 120 sends ACK (response signal) in response to the power state check signal from the electro-communication controller 123 to the first communication module 110 via the electric signal line 133.

If ACK (response signal) is returned from the second communication module 120 in response to the power state check signal sent from the first communication module 110, the first communication module 110 determines that the power supply circuit 121 of the second communication module 120 has already started. This means that the first communication module 110 fails to receive an optical signal from the second communication module 120 even though the power supply circuit 121 of the second communication module 120 has already started. The first control circuit 141 thus determines that an optical communication error is occurring, and sends information indicating the occurrence of an optical communication error to the log device 150.

If ACK (response signal) is not returned in response to the power state check signal, the first communication module 110 may not be able to determine whether the power supply circuit 121 of the second communication module 120 has not yet started or the power supply circuit 121 has already started but an optical-communication and electro-communication error is occurring.

Figure 4:
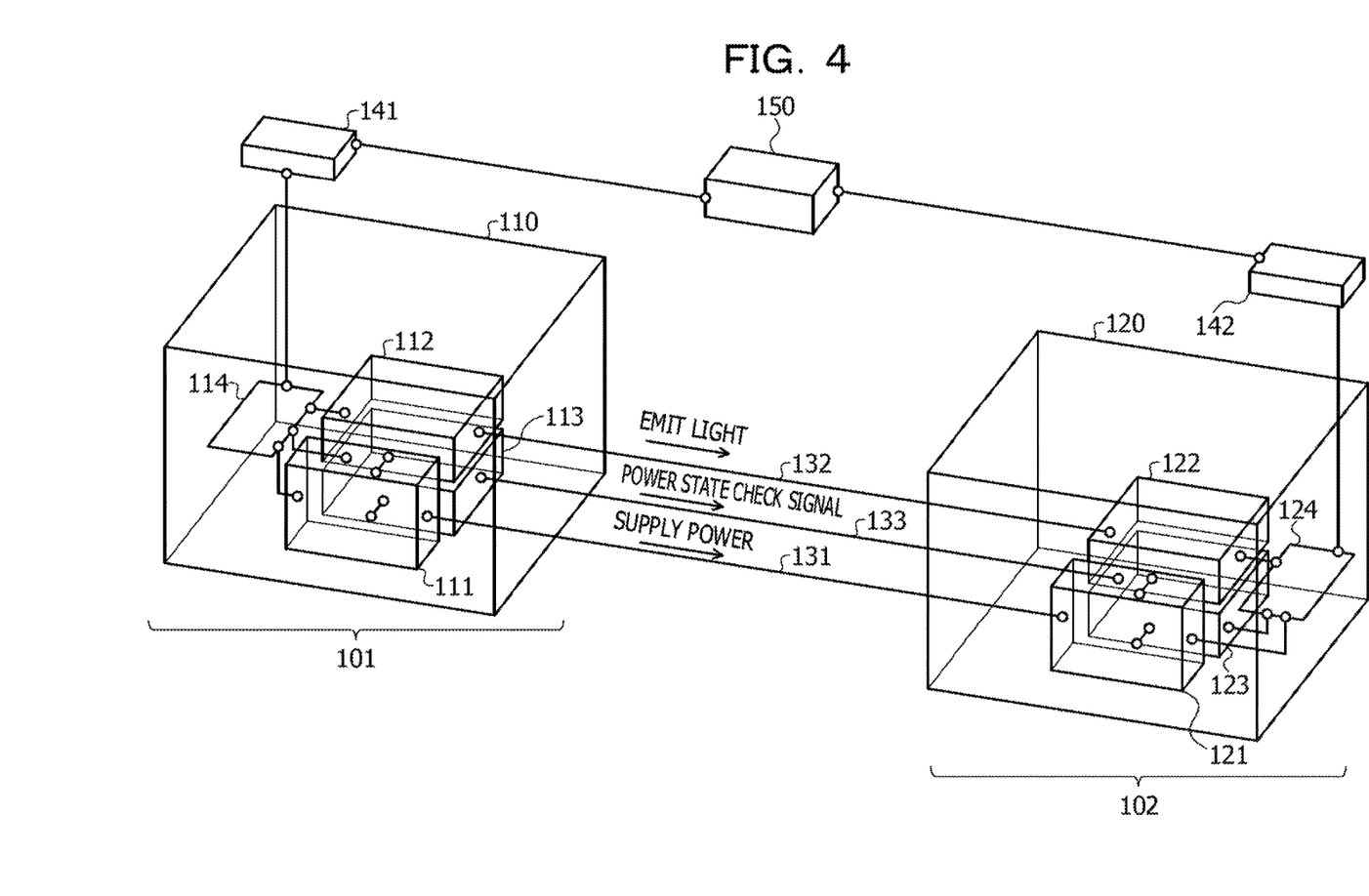
FIG. 4 illustrates an example of a state in which a communication device module supplies power to the other communication device module.

FIG. 4 illustrates an example of a state in which a communication device module supplies power to the other communication device module. In FIG. 4, elements similar to those in FIG. 3 are designated by like reference numerals, and an explanation thereof may be omitted. If the electro-communication controller 113 has not received ACK in response to the power state check signal from the second communication module 120, the first control circuit 141 supplies power from the power supply circuit 111 to the second communication module 120 via the power supply line 131. The first control circuit 141 also sends a light emission request signal from the electro-communication controller 113 to the second communication module 120 via the electric signal line 133.

The light emission request signal is a signal for requesting the second communication module 120 to send an optical signal from the optical-communication controller 122. Normally, if the second communication module 120 is started by external power, it does not send an optical signal for a safety reason. Even in this case, as a result of the first communication module 110 supplying power to the second communication module 120 and sending a light emission request signal to the second communication module 120, the second communication module 120 may send an optical signal. The first communication module 110 may not necessarily send a light emission request signal if the second communication module 120 sends an optical signal when it is started by external power.

If an optical signal is not returned in response to a light emission request signal sent to the second communication module 120 after the first communication module 110 has supplied power to the second communication module 120, the first communication module 110 may determine that an optical-communication and electro-communication error is occurring due to a failure of the second communication module 120. Thus, if the optical-communication controller 112 does not receive an optical signal in response to the light emission request signal from the second communication module 120, the first control circuit 141 sends error information to the log device 150.

Figure 5:
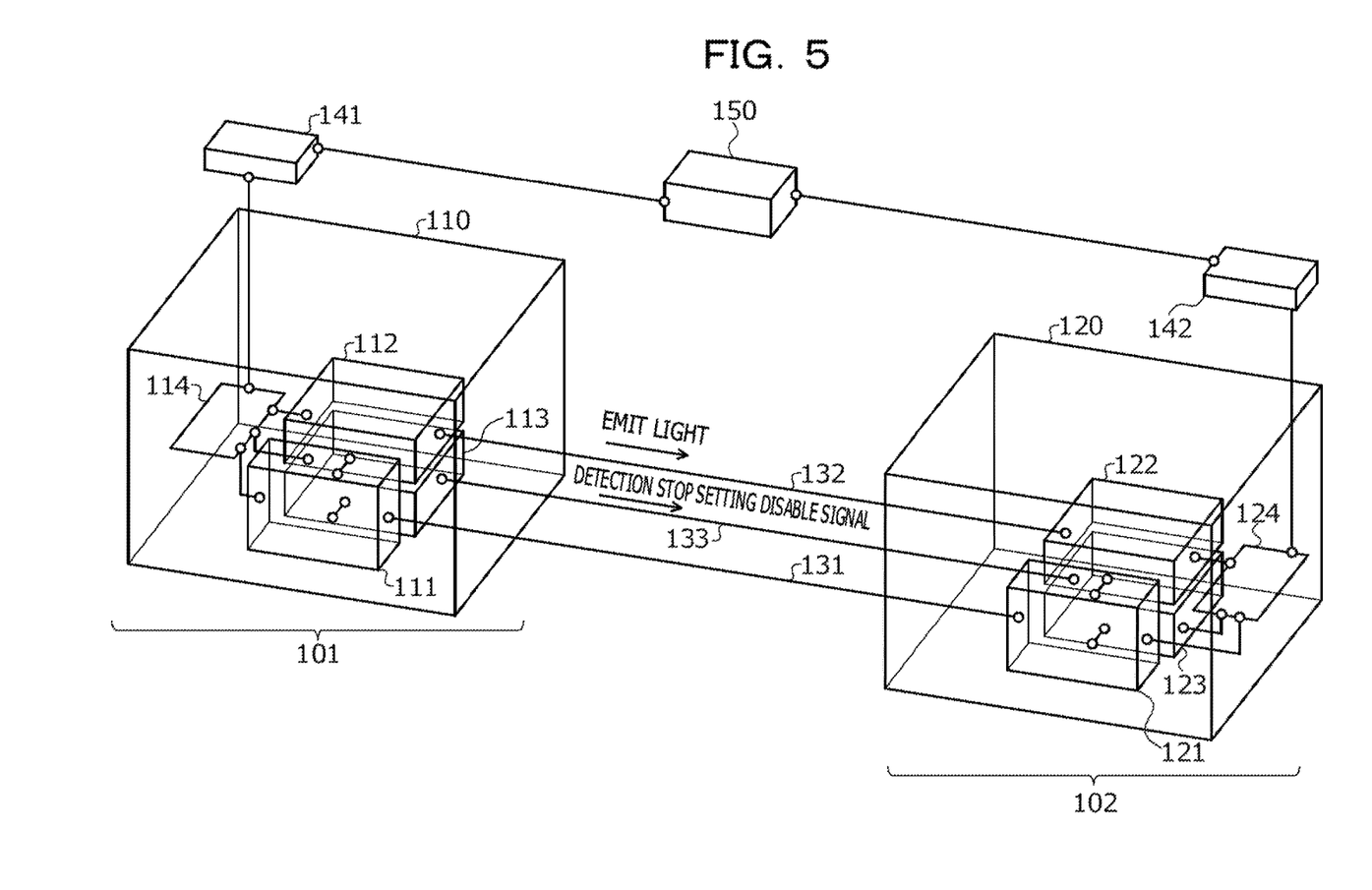
FIG. 5 illustrates an example of a state in which a communication device module is waiting for a power supply circuit of the other communication device module to start.

FIG. 5 illustrates an example of a state in which a communication device module is waiting for the power supply circuit of the other communication device module to start. In FIG. 5, elements similar to those in FIG. 4 are designated by like reference numerals, and an explanation thereof may be omitted. If an optical signal is returned in response to a light emission request signal sent to the second communication module 120 after the first communication module 110 has supplied power to the second communication module 120 as illustrated in FIG. 4, the first communication module 110 may determine that the power supply circuit 121 of the second communication module 120 has not yet started.

In this case, the first control circuit 141 stops supplying power from the power supply circuit 111 to the second communication module 120, and shifts to a start waiting sequence for waiting for the second communication module 120 to start. In the start waiting sequence, the first control circuit 141 repeatedly sends a detection stop setting disable signal indicating an instruction to disable the detection stop setting, that is, a signal indicating an instruction to enable the detection of LOS alarms, from the electro-communication controller 113 to the second communication module 120.

Figure 6:
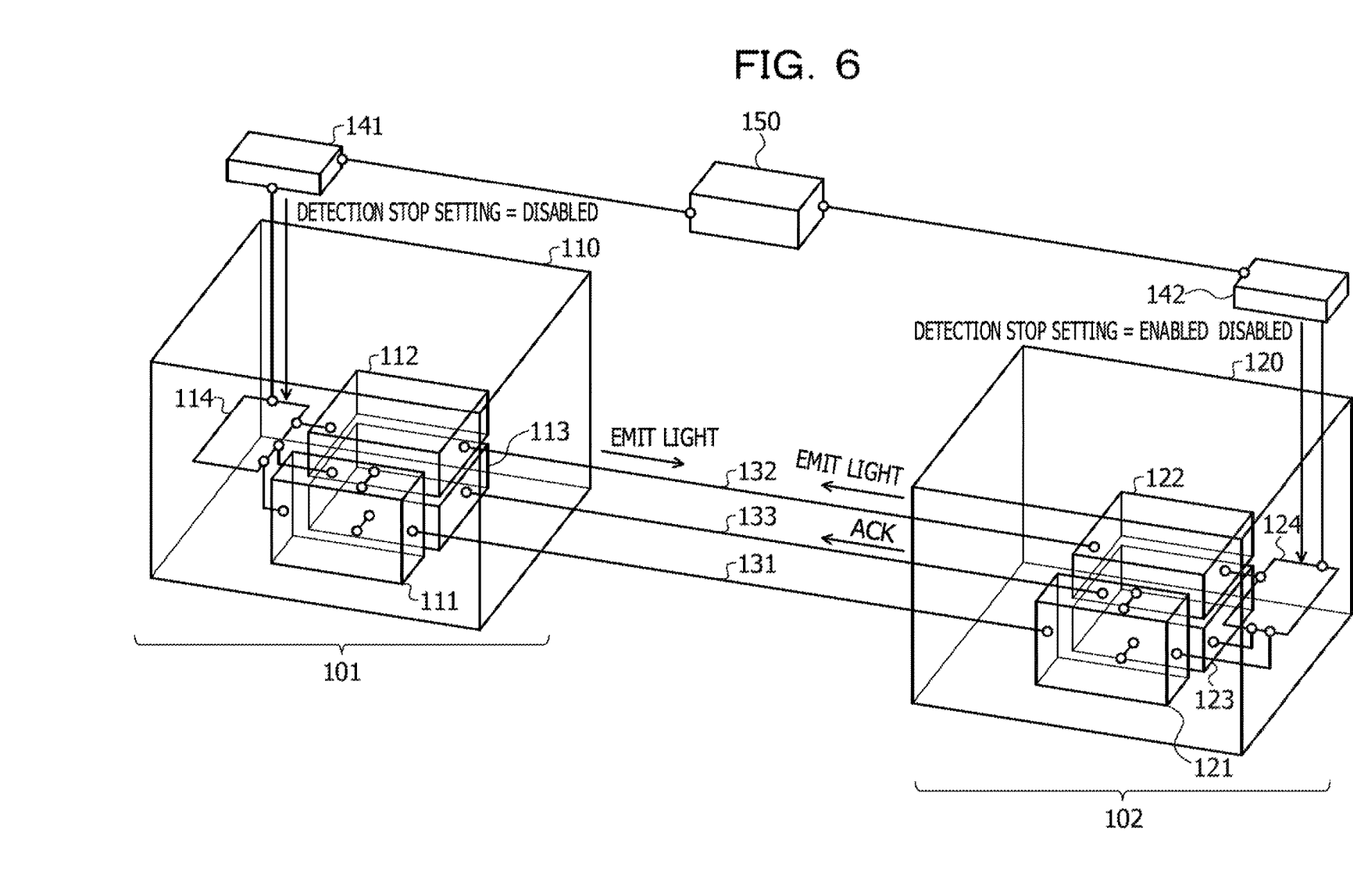
FIG. 6 illustrates an example of a state in which the power supply circuit of the other communication device module has started.

FIG. 6 illustrates an example of a state in which the power supply circuit of the other communication device module has started. In FIG. 6, elements similar to those in FIG. 5 are designated by like reference numerals, and an explanation thereof may be omitted. In the state illustrated in FIG. 6, when the power supply circuit 121 of the second communication module 120 has started, the second control circuit 142 initializes the control register 124.

This enables the optical channel in the optical-communication controller 122, and the optical-communication controller 122 emits light. An optical signal emitted from the optical-communication controller 122 is ready to be sent to the first communication module 110 via the optical signal line 132. The initialization of the control register 124 may temporarily enable the detection stop setting for stopping the detection of LOS alarms.

The second control circuit 142 causes the electro-communication controller 123 to receive the detection stop setting disable signal repeatedly sent from the first communication module 110. The second control circuit 142 also causes the electro-communication controller 123 to send ACK to the first communication module 110 in response to the received detection stop setting disable signal.

Based on the received detection stop setting disable signal, the second control circuit 142 operates the control register 124 to disable the detection stop setting in the second communication module 120. Then, the optical-communication controller 122 is ready to output a LOS alarm to the second control circuit 142 via the control register 124 if it fails to receive an optical signal from the first communication module 110.

If the electro-communication controller 113 receives ACK from the second communication module 120 in response to the detection stop setting disable signal, the first control circuit 141 operates the control register 114 to disable the detection stop setting in the first communication module 110. Then, the optical-communication controller 112 is ready to output a LOS alarm to the first control circuit 141 via the control register 114 if it fails to receive an optical signal from the second communication module 120.

Figure 7:
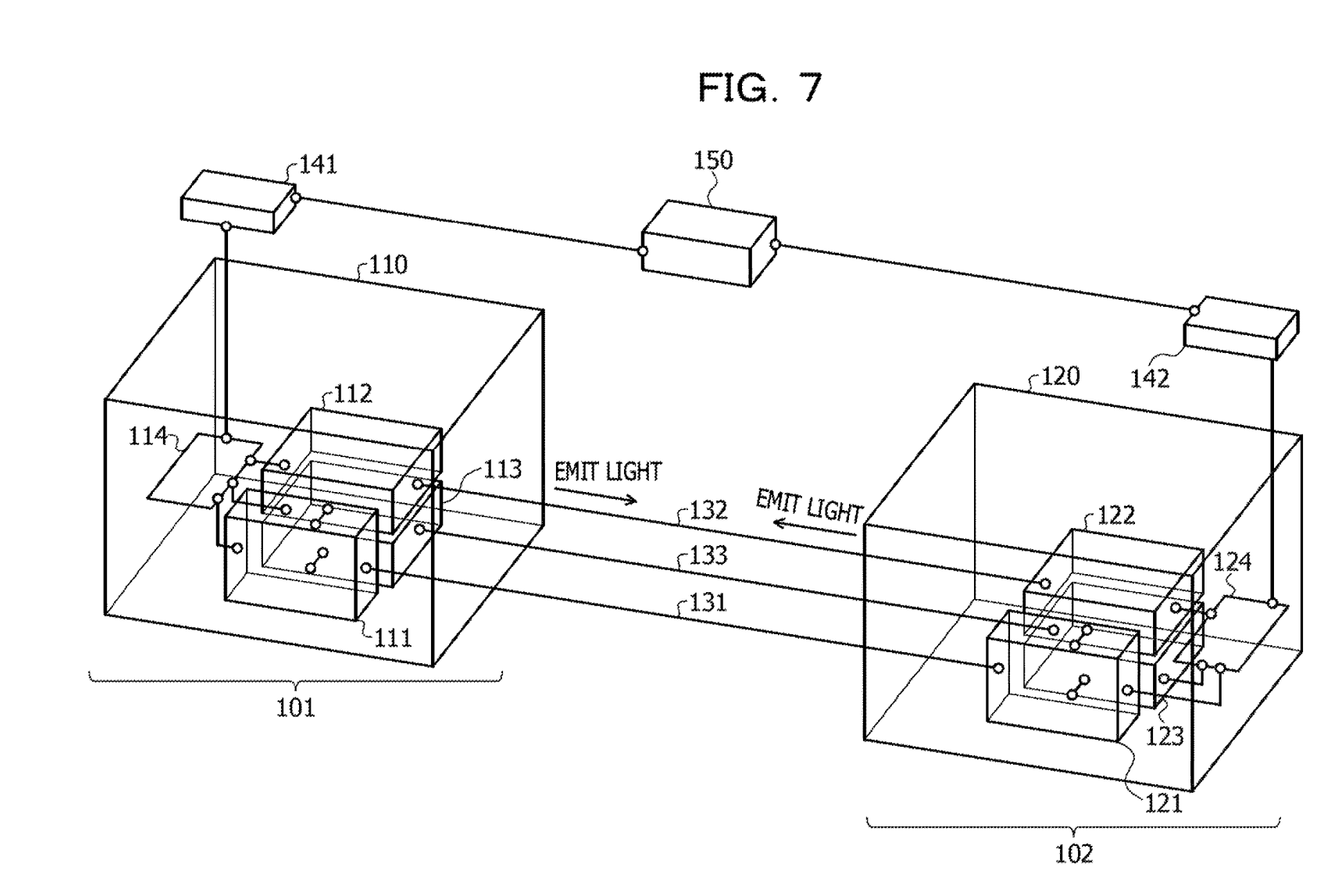
FIG. 7 illustrates an example of a state in which communication devices have started optical communication.

FIG. 7 illustrates an example of a state in which communication device modules have started optical communication. In FIG. 7, elements similar to those in FIG. 6 are designated by like reference numerals, and an explanation thereof may be omitted. In FIG. 7, both of the first and second communication modules 110 and 120 have disabled the detection stop setting. The first and second communication modules 110 and 120 are ready to perform optical communication via the optical signal line 132. The first and second communication modules 110 and 120 may perform electro-communication via the electric signal line 133, as well as optical communication via the optical signal line 132.

According to the process illustrated in FIGS. 2 through 7, without using a management server, for example, the mere sending and receiving of signals between the communication modules may reduce the false detection of LOS alarms caused by a difference in the startup timing between communication modules. After the communication modules have started, the detection of LOS alarms may normally be detected. Then, if an optical communication error occurs, a LOS alarm may be detected and sent to the log device 150.

Figure 8A:
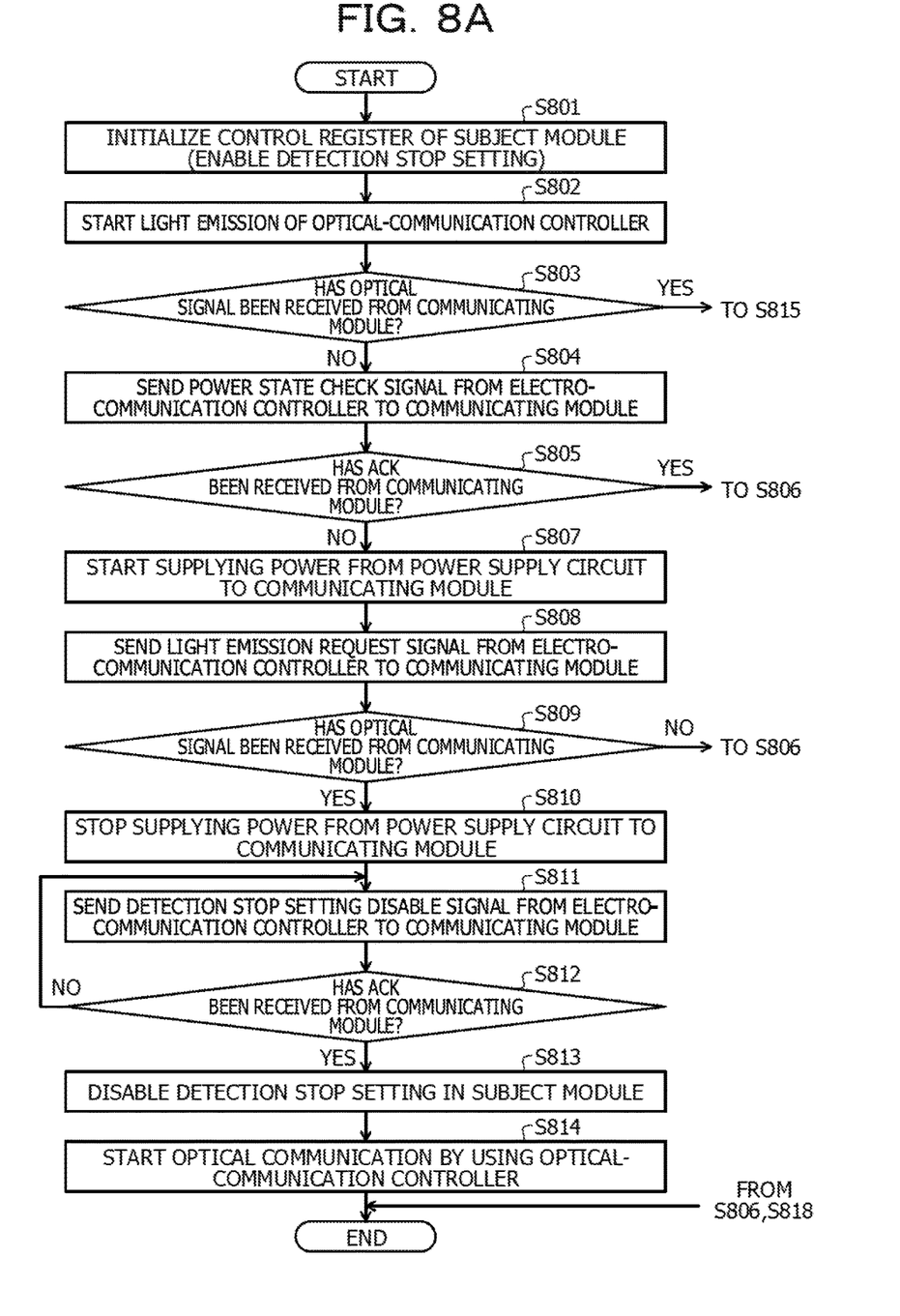
FIGS. 8A and 8B illustrate an example of inspection processing executed by a control circuit of a communication device.
Figure 8B:
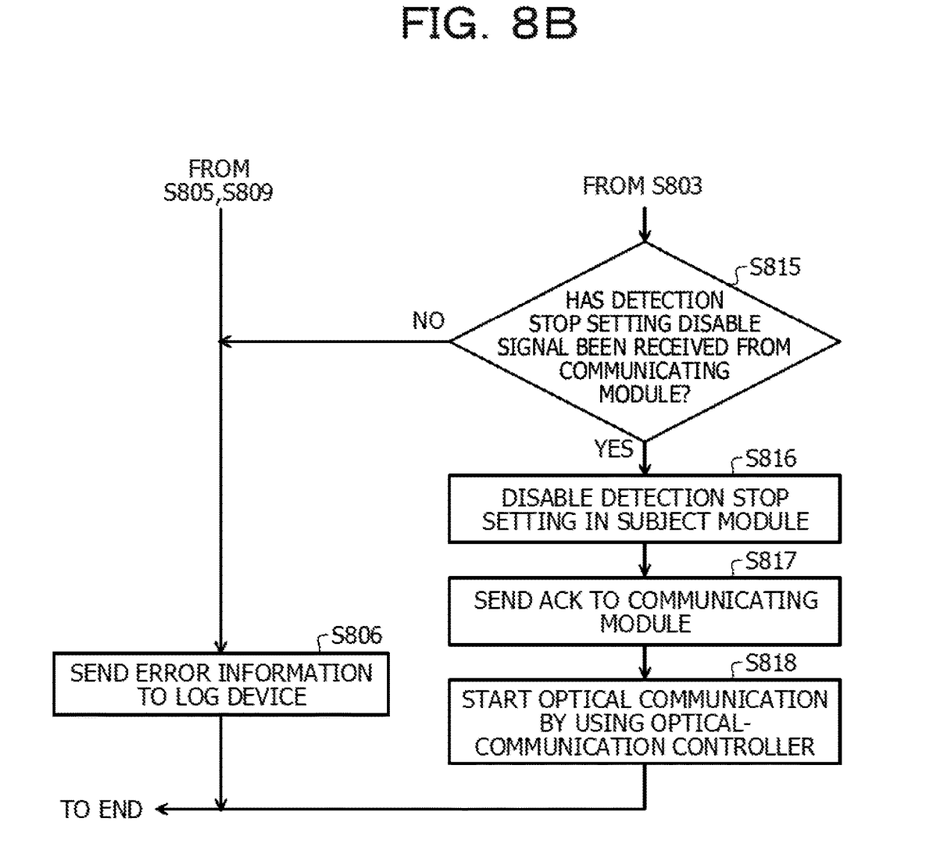

FIGS. 8A and 8B illustrate an example of inspection processing executed by a control circuit of a communication device. When power is supplied to the first and second communication modules 110 and 120, the first and second control circuits 141 and 142 execute the operations illustrated in FIGS. 8A and 8B, for example. Hereinafter, processing executed by the first control circuit 141 that controls the first communication module 110 will be discussed below. Concerning processing executed by the second control circuit 142 that controls the second communication module 120, processing may similarly be executed.

The first control circuit 141 initializes the control register 114 of the first communication module 110 (subject module) (operation S801). Initializing of the control register 114 may include enabling of the detection stop setting for stopping the detection of LOS alarms. The optical-communication controller 112 starts to emit light under the control of the first control circuit 141 via the control register 114 (operation S802).

The first control circuit 141 determines whether the optical-communication controller 112 has received an optical signal from the second communication module 120 (communicating module) (operation S803). If the optical-communication controller 112 has not received an optical signal from the second communication module 120 (No in operation S803), the first control circuit 141 sends a power state check signal from the electro-communication controller 113 to the second communication module 120 (operation S804).

The first control circuit 141 determines whether ACK has been received in response to the power state check signal from the second communication module 120 within a predetermined time after the power state check signal has been sent in operation S804 (operation S805). If ACK has been received (Yes in operation S805), the first control circuit 141 may determine that an optical communication error is occurring between the first and second communication modules 110 and 120. In this case, the first control circuit 141 sends error information indicating the occurrence of an error to the log device 150 (operation S806), and terminates the processing.

If ACK has not been received in operation S805 (No in operation S805), the first control circuit 141 starts supplying power from the power supply circuit 111 to the second communication module 120 (operation S807). The first control circuit 141 also sends a light emission request signal from the electro-communication controller 113 to the second communication module 120 (operation S808).

The first control circuit 141 determines whether the optical-communication controller 112 has received an optical signal from the second communication module 120 within a predetermined time after the light emission request signal has been sent in operation S808 (operation S809). If the optical-communication controller 112 has not received an optical signal (No in operation S809), the first control circuit 141 may determine that an optical-communication and electro-communication error is occurring due to a failure of the second communication module 120. In this case, the processing proceeds to operation S806, and the first control circuit 141 sends error information to the log device 150 and terminates the processing.

If the optical-communication controller 112 has received an optical signal in operation S809 (Yes in operation S809), the first control circuit 141 may determine that the power supply circuit 121 of the second communication module 120 has not yet started. In this case, the first control circuit 141 stops supplying power from the power supply circuit 111 to the second communication module 120 (operation S810).

The first control circuit 141 sends a detection stop setting disable signal indicating an instruction to disable the detection stop setting for stopping the detection of LOS alarms from the electro-communication controller 113 to the second communication module 120 (operation S811). The first control circuit 141 determines whether ACK has been received from the second communication module 120 within a predetermined time after the detection stop setting disable signal has been sent in operation S811 (operation S812).

If ACK has not been received in operation S812 (No in operation S812), the processing returns to operation S811. If ACK has been received in operation S812 (Yes in operation S812), the first control circuit 141 may determine that the power supply circuit 121 of the second communication module 120 has started. In this case, the first control circuit 141 operates the control register 114 to disable the detection stop setting in the first communication module 110 (operation S813). The first control circuit 141 causes the optical-communication controller 112 to start optical communication with the second communication module 120 (operation S814). Then, the processing has been completed.

If the optical-communication controller 112 has received an optical signal from the second communication module 120 in operation S803 (Yes in operation S803), the first control circuit 141 may determine that the power supply circuit 121 of the second communication module 120 has started earlier than the power supply circuit 111 of the first communication module 110. In this case, the first control circuit 141 determines whether a detection stop setting disable signal has been received from the second communication module 120 (communicating module) within a predetermined time (operation S815).

If a detection stop setting disable signal has not been received in operation S815 (No in operation S815), the first control circuit 141 may determine that an electro-communication error is occurring between the first and second communication modules 110 and 120. In this case, the processing proceeds to operation S806, and the first control circuit 141 sends error information to the log device 150 and terminates the processing.

If a detection stop setting disable signal has been received in operation S815 (Yes in operation S815), the processing proceeds to operation S816. For example, the first control circuit 141 operates the control register 114 to disable the detection stop setting in the first communication module 110 (operation S816).

The first control circuit 141 sends ACK to the second communication module 120 in response to the received detection stop setting disable signal (operation S817). The first control circuit 141 causes the optical-communication controller 112 to start optical communication with the second communication module 120 (operation S818). Then, the processing has been completed.

In operations S801 through S814, when a communication device, for example, the first communication device 101, is started, it enters a first state and starts sending an optical signal to a different communication device, for example, the second communication device 102. The first state is a state in which even if interruption in optical communication performed with a different communication device is detected, error information is not sent, and more specifically, for example, a state in which the above-described detection stop setting is enabled. If the communication device detects that an optical signal is not received from the different communication device, it sends a first electric signal to the different communication device. The first electric signal may be the above-described power state check signal. Instead of sending the first electric signal, the communication device may send various other electric signals, for example, an optical communication start signal, to the different communication device. If a second electric signal is not received from the different communication device in response to the first electric signal, the communication device supplies power to the different communication device. The second electric signal may be ACK in response to the above-described power state check signal.

If the communication device detects that an optical signal is received from the different communication device after supplying power to the different communication device, it stops supplying power. The communication device repeatedly sends a third electric signal indicating an instruction to shift to a second state to the different communication device until it receives a fourth electric signal in response to the third electric signal from the different communication device. The second state is a state in which if interruption in optical communication is detected, error information is sent, and more specifically, for example, a state in which the above-described detection stop setting is disabled. The third electric signal may be the above-described detection stop setting disable signal. The fourth electric signal may be ACK in response to the above-described detection stop setting disable signal. Upon receiving the fourth electric signal from the different communication device, the communication device shifts to the second state and starts optical communication with the different communication device.

In operations S801 through S803 and S815 through S818, if the communication device detects that an optical signal is received from the different communication device at a startup time of the communication device, it receives a fifth electric signal indicating an instruction to shift to the second state from the different communication device. The fifth electric signal may be the above-described detection stop setting disable signal. The communication device sends a sixth electric signal in response to the received fifth electric signal to the different communication device, shifts to the second state, and starts optical communication with the different communication device. The sixth electric signal may be ACK in response to the above-described detection stop setting disable signal.

Figure 9:
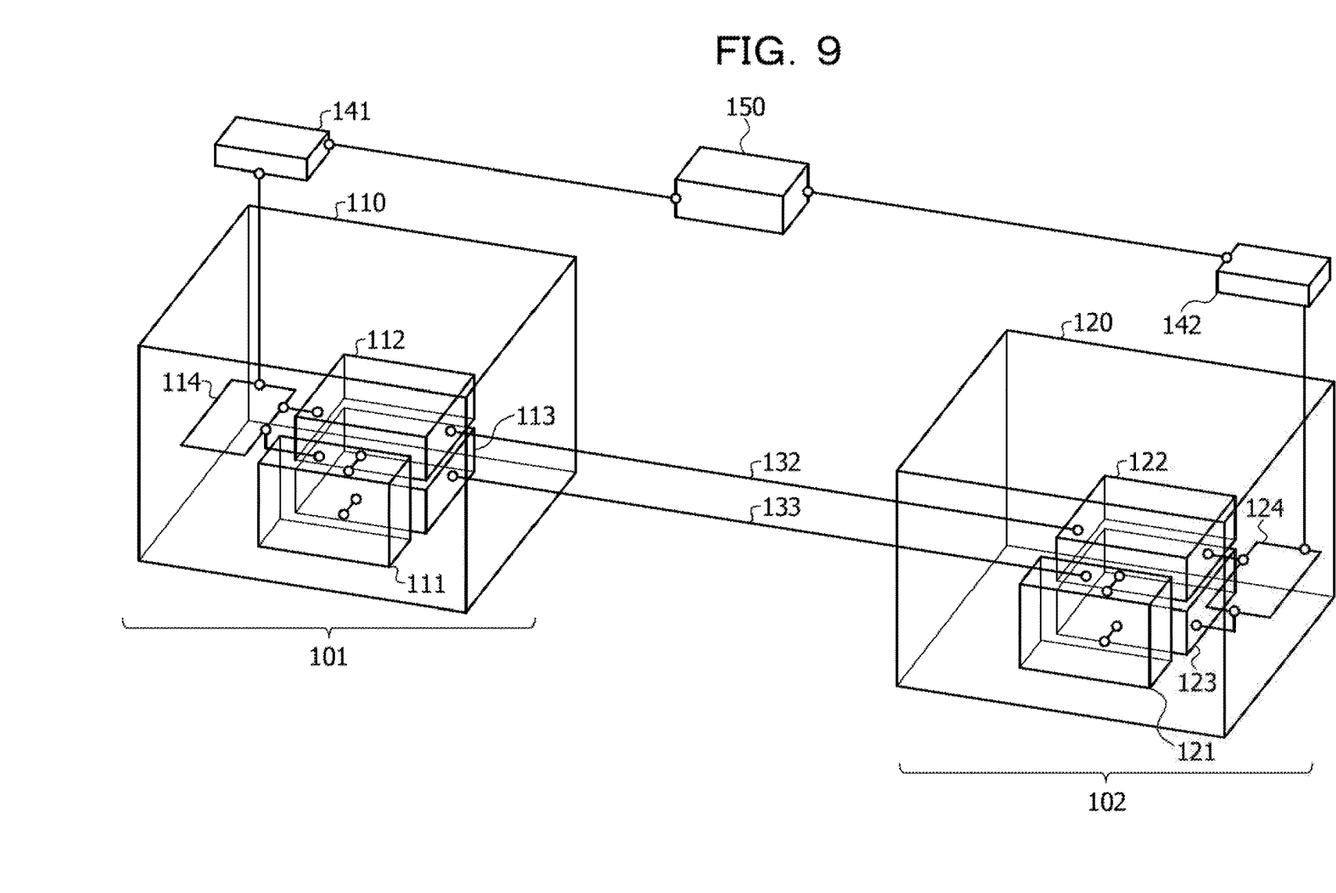
FIG. 9 illustrates another example of a communication system and another example of communication devices.

FIG. 9 illustrates another example of a communication system and another example of communication devices. In FIG. 9, elements similar to those in FIG. 1 are designated by like reference numerals, and an explanation thereof may be omitted. In FIG. 1, the power supply circuit 111 of the first communication module 110 and the power supply circuit 121 of the second communication module 120 are coupled to each other via the power supply line 131. However, this configuration is only an example.

As illustrated in FIG. 9, the power supply circuit 111 of the first communication module 110 and the power supply circuit 121 of the second communication module 120 may not be coupled to each other. For example, the configuration in which power is supplied from the power supply circuit 111 of the first communication module 110 to the second communication module 120 and the configuration in which power is supplied from the power supply circuit 121 of the second communication module 120 to the first communication module 110 may be omitted. In this case, the power supply circuit 111 and the control register 114 may not be coupled to each other, and the power supply circuit 121 and the control register 124 may not be coupled to each other.

Processing executed by the first and second communication devices 101 and 102 illustrated in FIG. 9 may be similar to that illustrated in FIGS. 8A and 8B. Operations S807 through S810 in FIGS. 8A and 8B may be omitted. If ACK is not returned in response to the power state check signal sent to the second communication module 120, the first control circuit 141 sends a detection stop setting disable signal to the second communication module 120.

As described above, a communication device sends error information indicating an error in optical communication performed with a different communication device to a predetermined device after receiving the second electric signal in response to the first electric signal sent to the different communication device. If the communication device fails to perform optical communication and then fail to perform electro communication with the different communication device, it is less likely that error information will be sent. This may reduce the possibility that a state in which the different communication device has not yet started will be misinterpreted for an optical communication error. As a result, false detection of optical communication errors may be reduced even if the startup timing is different between communication modules.

If the second electric signal is not returned in response to the first electric signal sent to the different communication device, the communication device may supply power to the different communication device and then may send error information indicating an error in optical communication performed with the different communication device after it has supplied power to the different communication device. In case of a failure of the different communication device, the communication device may send error information to the predetermined device, and if the different communication device has not yet started, the communication device may not send error information. It may thus be less likely to fail to send error information when an optical-communication and electro-communication error is occurring due to a failure of the different communication device.

In the above-described communication device and inspection method, false detection of optical communication errors may be reduced even if the startup timing is different between communication devices.

In inter-module communication in computers, such as supercomputers, an optical-communication high-speed transmission method may be used. A communication device to send and receive optical signals is controlled by built-in firmware so that it will issue an alarm in case of an error, such as a low level of an optical signal received from a communicating device.

As described above, a difference in the startup timing may be generated between power supply circuits of modules. Consequently, between two communication devices on an optical communication channel, as viewed from a communication device started earlier, the other communication device does not emit light. The communication device may thus misinterpret that the other communication device has stopped emitting light due to a failure and may output a LOS alarm.

To avoid such false detection of errors, a management server may clear alarms all together when it has checked that the power supply circuits of the communication devices (modules) have started. However, communication between the management server and the modules is slower than internal processing within the communication devices (modules), and thus, an interval may be generated after the power supply circuits have started and before alarms are cleared. During this interval, alarms are cleared, and thus, errors occurring during this interval may not be detected. A large-scale parallel computer may manage many communication devices, which may impose a heavy burden on the management server.

The above-described communication device monitors the power state of the communicating device, and executes built-in firmware processing to stop the detection of LOS alarms until the startup of the power supply circuit of the communicating device is completed. When the power supply circuits of both of the communication devices on the transmission channel have started, the detection stop setting of alarms is canceled. This may make it possible to reduce false detection of optical communication errors without using a management server.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An inspection method comprising:
   transmitting, at a startup time of a first communication device, a first optical signal from an optical-communication circuit, which is provided in the first communication device and is capable of performing optical communication with a second communication device, to the second communication device;
   transmitting, when not receiving a second optical signal in response to the first optical signal from the second communication device, a first electric signal from an electro-communication circuit, which is provided in the first communication device and is capable of performing electro communication with the second communication device, to the second communication device;

transmitting, when receiving a second electric signal which is transmitted from the second communication device in response to the first electric signal, to a device, error information indicating an error which occurs in optical communication with the second communication device;

supplying, when not receiving the second electric signal, power from the first communication device to the second communication device;

transmitting a third electric signal from the electro-communication circuit to the second communication device; and transmitting, when not receiving a third optical signal from the second communication device in response to the third electric signal, to the device, the error information indicating the error which occurs in the optical communication with the second communication device.

2. The inspection method according to claim 1, wherein after entering, at the startup time of the first communication device, a first state in which the error information is not transmitted to the device when an interruption in the optical communication is detected, the transmitting the first electric signal to the second communication device is performed.

3. The inspection method according to claim 2, further comprising:

stopping, when the optical-communication circuit receives the third optical signal from the second communication device in a state in which the power is supplied to the second communication device, supplying the power to the second communication device; and transmitting, to the second communication device, fourth electric signal indicating an enter to a second state in which the error information is transmitted to the device when an interruption in the optical communication is detected.

4. The inspection method according to claim 3, further comprising:

transmitting repeatedly the fourth electric signal until the electro-communication circuit receives a fifth electric signal from the second communication device in response to the fourth electric signal.

5. The inspection method according to claim 4, further comprising:

entering, when the electro-communication circuit receives the fifth electric signal, the second state; and starting the optical communication with the second communication device.

6. The inspection method according to claim 2, further comprising:

transmitting, after receiving a sixth electric signal, which is transmitted from the second communication device and instructs entering a second state in which the error information is transmitted to the device when an interruption in the optical communication is detected, in the electro-communication circuit in a case where the second optical signal from the second communication device is detected in the optical communication circuit at the startup time of the first communication device, a seventh electric signal to the second communication device;

entering the second state; and starting optical communication with the second communication device.

* * * * *